United States Patent
Bifulco et al.

(10) Patent No.: US 10,243,922 B2
(45) Date of Patent: Mar. 26, 2019

(54) EFFICIENT SERVICE FUNCTION CHAINING OVER A TRANSPORT NETWORK

(71) Applicant: NEC EUROPE LTD., Heidelberg (DE)

(72) Inventors: Roberto Bifulco, Heidelberg (DE); Anton Matsiuk, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 7 days.

(21) Appl. No.: 15/513,222

(22) PCT Filed: Sep. 23, 2014

(86) PCT No.: PCT/EP2014/070273
§ 371 (c)(1),
(2) Date: Mar. 22, 2017

(87) PCT Pub. No.: WO2016/045710
PCT Pub. Date: Mar. 31, 2016

(65) Prior Publication Data
US 2017/0302623 A1    Oct. 19, 2017

(51) Int. Cl.
*H04L 29/12* (2006.01)
*H04L 12/851* (2013.01)
*H04L 12/715* (2013.01)
*H04L 12/725* (2013.01)
*H04L 12/24* (2006.01)

(52) U.S. Cl.
CPC .............. *H04L 61/35* (2013.01); *H04L 45/64* (2013.01); *H04L 47/2441* (2013.01); *H04L 41/0266* (2013.01); *H04L 45/30* (2013.01)

(58) Field of Classification Search
CPC ....................................................... H04L 61/35
See application file for complete search history.

(56) References Cited

U.S. PATENT DOCUMENTS

| | | | |
|---|---|---|---|
| 7,768,917 B2* | 8/2010 | Nakayama | H04L 47/10 370/204 |
| 2010/0172292 A1* | 7/2010 | Ramachandran | H04W 84/10 370/328 |
| 2015/0365322 A1* | 12/2015 | Shatzkamer | H04L 45/74 370/392 |

OTHER PUBLICATIONS

Jin X et al: "SoftCell: Taking Control of Cellular Core Network", Internet Citation, May 15, 2013 (May 15, 2013), pp. 1-14, XP002719715.

Fernando D Rao Cisco L Fang Microsoft M Napilierala ATT&T N So Vinci Systems A Farrel Juniper Networks R: "Virtual Topologies for Service Chaining in BGP/IP MPLS VPNs; draft-rfernando-l3vpn-service-chaining-04.txt", Virtual Topologies for Service Chaining in BGP/IP MPLS VPNS; Draft-Rfernando-L3VPN-Service-Chaining-04. txt, Internet Engineering Task Force, IETF; Standardworkingdraft, Internet Society (ISOC) 4, Rue Des Falaises CH-1205 Geneva, Switzerland, Jul. 5, 2014 (Jul. 5, 2014), pp. 1-17, XP015100524.

(Continued)

*Primary Examiner* — Parth Patel
(74) *Attorney, Agent, or Firm* — Leydig, Voit & Mayer, Ltd.

(57) ABSTRACT

A method for operating a network includes implementing at least one service function chain (SFC) including several service functions (SFs) for providing traffic steering; encoding traffic steering information related to the at least one SFC; and using redundant information in an addressing scheme of network hosts for addressing the SFs.

17 Claims, 7 Drawing Sheets

(56) References Cited

OTHER PUBLICATIONS

Bitar Verizon G Heron L Fang Microsoft R Krishnan Brocade Communications N Leymann Deutsche Telekom N: "Interface to the Routing System (I2RS) for Service Chaining: Use Cases and Requirements; draft-bitar-i2rs-service-chaining-01.txt", interface to the routing system (I2RS) for Service Chanining; Use Cases and Requirements; Draft-Bitar-I2RS-Service-Chaining-01.txt, Internet Engineering Task Force, IETF; Standardworkingdraft, Internet Society (ISOC) 4, Rue Des Falaises CH-1205 Geneva, Feb. 14, 2014 (Feb. 14, 2014), pp. 1-15, XP015096866.

Boucadair C Jacquenet France Telecom R Parker Affirmed Networks D Lopez Telefonica I+D P Yegani M: "Differentiated Service Function Chaining Framework; draft-boucadair-network.function-chaining-03.txt", Differentiated Service Function Chaining Framework; Draft-Boucadair-Network-Function-Chaining-03.txt, Internet Engineering Task Force, IETF; Standardworkingdraft, Internet Society (ISOC) 4, Rue Des Falaises CH-1205 Geneva, Switzerland, Aug. 21, 2013 (Aug. 21, 2013, pp. 1-22, XP015093513.

\* cited by examiner

EFFICIENT SERVICE FUNCTION CHAINING OVER A TRANSPORT NETWORK

CROSS REFERENCE TO RELATED APPLICATIONS

This application is a U.S. National Stage Application under 35 U.S.C. § 371 of International Application No. PCT/EP2014/070273 filed on Sep. 23, 2014. The International Application was published in English on Mar. 31, 2016 as WO 2016/045710 A1 under PCT Article 21(2).

FIELD

The present invention relates to a method for operating a network, especially an IP network, wherein at least one service function chain, SFC, comprising several service functions, SFs, is implemented for providing traffic steering, wherein traffic steering information related to the at least one SFC is encoded. Further, the present invention relates to a network, especially an IP network, wherein at least one service function chain, SFC, comprising several service functions, SFs, is implemented for providing traffic steering, wherein traffic steering information related to the at least one SFC is encoded.

BACKGROUND

Network service functions, SFs, or middleboxes are essential elements in operators' networks, which perform various traffic processing tasks in order to provide desired service sets and meet required Service-Level Agreements, SLAs. Such functions can be linked into sequences, thus creating service function chains, SFCs. For instance, subscriber's traffic may need to pass through Firewall, DPI, Traffic Optimizer and Network Address Translation, NAT, in Internet Service Provider, ISP, network on its way towards Internet. Depending on the service policies and traffic classes, the set and the sequence of functions in a chain may vary significantly. Service functions can dynamically react on incoming traffic modifying packets, flows or sessions, redirecting and terminating them. Moreover, SFCs can be reorganized dynamically either by operator's policies through Network Monitoring/Management System, NMS or in reaction to their in-line operation. However, traditional L2/L3 forwarding mechanisms in ISP networks cannot meet steering requirements introduced by presence of SFCs. Considering that in modern architectures SFs can be virtualized, mobility and horizontal scaling introduce additional issues for dynamicity of SFCs.

Today common SFC steering deployments are mainly implemented with manual and static low-level configurations of forwarding equipment using either L3 routing, policy-based routing, traffic engineering protocols, tunneling mechanisms or combinations of these techniques. Such approaches are hardly scalable, error prone and lack dynamicity and centralized control for applicability of abstracted service policies. Besides, many SFs perform modifications of packets on higher levels L4-L7 and require corresponding high-granular steering decision. Whereas, forwarding engines cannot recognize these modifications neither in-line nor through any signaling mechanisms between transport network and SFs. That leads to non-optimal SFC architectures with coarse and inefficient SFC policies and, as a result, additional performance costs of SFs.

Current research approaches to solve steering issues, introduced by SFCs, mostly try to implement transfer of additional SFC metadata, which can carry both steering policies and traffic context required by SFs. Relative to underlying transport network, this metadata can be transferred either in-band, out-of-band or in a hybrid mode. Several in-band and hybrid approaches propose to transfer metadata within existing unused packet headers, see "FlowTags: Enforcing Network-Wide Policies in the Presence of Dynamic Middlebox Actions" at website cs.princeton.edu/courses/archive/fall13/cos597E/papers/flowtags.pdf, "SIMPLE-fying Middlebox Policy Enforcement Using SDN" at website ece.cmu.edu/~ece739/papers/simple.pdf and "Stratos: A Network-Aware Orchestration Layer for Virtual Middleboxes in Clouds" at website arxiv.org/pdf/1305.0209v2.pdf. However in that case forwarding equipment should be aware of such injections and has to be able to implement forwarding policies according to provided metadata. In most cases this requires significant modifications of underlying transport network equipment. Apart, scalability issues may arise as transfer of metadata usually exploits overheads with fixed and small number of bits Differentiated Service Code Point, DSCP, Type of Service, ToS, etc. Others propose to introduce additional packet headers, e.g. "Network Service Header" IETF Draft at website tools.ietforg/html/draft-quinn-nsh-02, for transfer of SFC metadata and to encapsulate traffic in overlay networks between service endpoints using tunneling mechanisms—VXLAN, NVGRE, STT. These architectures commonly require significant modification of termination points—usually software switches in hypervisors—and additional performance costs.

SUMMARY

In an embodiment, the present invention provides a method for operating a network. The method includes implementing at least one service function chain (SFC) comprising several service functions (SFs) for providing traffic steering; encoding traffic steering information related to the at least one SFC; and using redundant information in an addressing scheme of network hosts for addressing the SFs.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

According to embodiments of the present invention, forwarding network devices can be divided into two groups: SF-aware termination points and underlying transport IP L3 forwarding network (routers).

Transport IP network has to provide an isolated routing domain either virtualized—VRF, VRF-lite, MPLS L3 VPN, etc.—or physically separated. This routing domain may run any Interior Gateway Protocol, IGP, as well as can be established with static routing. Transport routers have to be configurable through either distributed—CLI—or centralized—NETCONF, RESTful API etc.—management interface. However, centralized control plane simplifies the distribution and reconfiguration of dynamic forwarding policies and can be aggregated with control plane of SF-aware forwarding devices.

SF-aware forwarding devices—usually software switches in hypervisors—are directly connected to SFs—commonly VMs—and perform specific in-line packet header modifications and forward traffic flows toward SFs according to forwarding policies. For dynamic distribution of forwarding policies they have to expose a management interface to logically centralized controller—OpenFlow, OVSDB, etc. As was mentioned before, this controller can be joined with transport network's control plane as well as can interact with it by means of other protocol.

In the remaining part of this document we will not focus on particular implementation of SF-aware forwarding devices and the ways they perform required forwarding, rather on architectural implementation of proposed invention. We assume that SF-aware forwarding devices are software switches, SwSw, with SFs directly connected to them by means of virtual interfaces. The transport IP network consists of hardware routers and runs any kind of routing protocol which allows the distribution of specific SFC routes through isolated routing SFC domain. However, proposed solution also can be implemented with source based policy-based routing, PBR, as well as in combination with MPLS or tunneling mechanisms.

Figure 1:
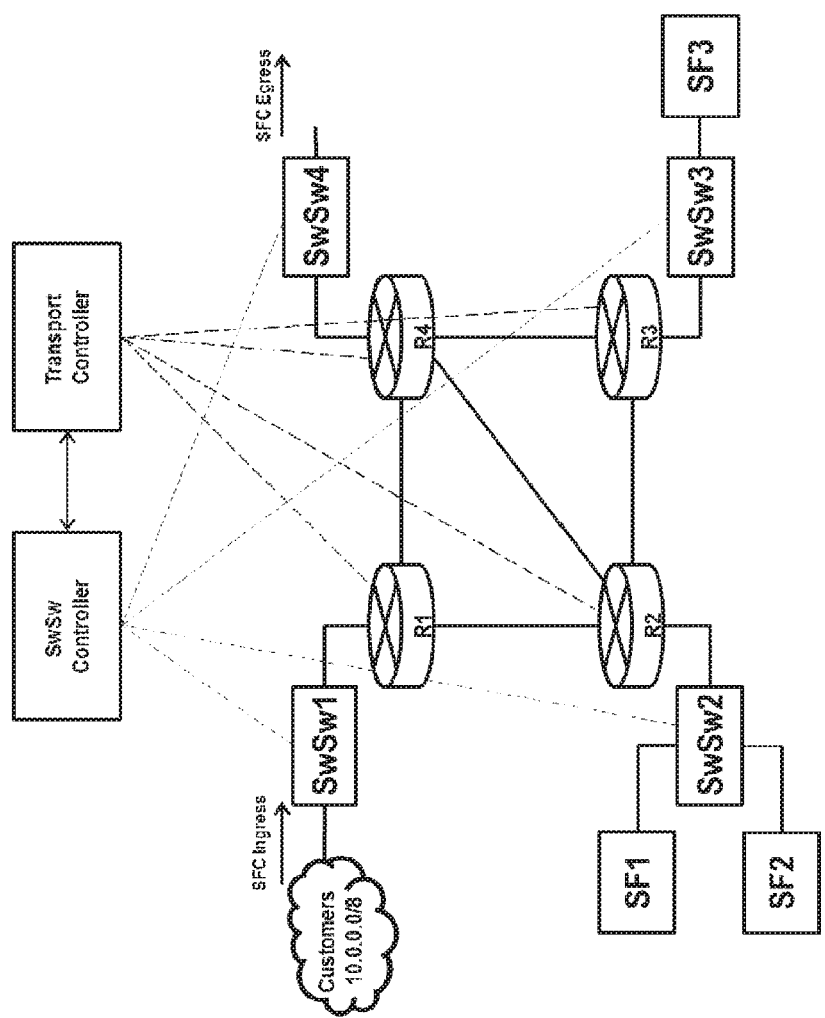
FIG. 1 shows an example of a network on which an embodiment of the invention can be applied.

We imply that service providers allocate continuous blocks of IP addresses either IPv4 or IPv6 to their subscribers. With IPv4 these addresses are usually private addresses (RFC1918): 10.0.0.0/8, 172.16.0.0/12, 192.168.0.0/16 (or 100.64.0.0/10 RFC6598 in some use cases) placed behind Carrier-Grade NAT, CG-NAT. In case of IPv6 addressing providers allocate continuous block or blocks of addresses, assigned to them from global unicast space (2000::/3) by appropriate Internet register. An example of the network with IPv4 addressing on which the invention can be applied is presented in FIG. 1.

In an embodiment, the present invention provides a method for operating a network and an according network for allowing a flexible, dynamic and fine-grained SFC steering over a transport network without adaptation of said network.

A method according to an embodiment is characterized in that redundant information in an addressing scheme of network hosts is used for addressing the SFs.

A network according to an embodiment is characterized by means for use of redundant information in an addressing scheme of network hosts for addressing the SFs.

According to an embodiment of the invention it has been recognized that it is possible to allow very effective traffic steering on the basis of SFCs, wherein addresses of service functions are directly placed into the address of a forwarded packet. Concretely, redundant information in an addressing scheme is used for addressing the SFs. Such an utilization of redundancy in an addressing scheme for traffic steering in service function chains provides a flexible, dynamic and fine-grained SFC steering without specific adaptations of the underlying transport network. This is an important departure from known implementations of SFCs.

Within a preferred embodiment the redundant information can be a common prefix of host addresses within the addressing scheme. Concretely, redundant bits are well known to the used equipment, since they are fixed by the network operator by means of configuration.

Preferably, the common prefix can be temporarily replaced with SFC metadata used for traffic steering between and/or to SFs. Such SFC metadata can contain a unique logical address or block of addresses that works or work as service function identifier, SF ID.

Such SF IDs or SF addresses can be represented as conventional network addresses and advertised into a routing domain of an underlying transport network for forwarding traffic towards a particular SF or particular SFs for providing a reliable steering.

Within a further preferred embodiment a centralized or decentralized control plane or controller for the network or transport network can install routing policies to or into at least one intermediate router towards an SF or SFs. Such an installation can be provided by means of IGP or static routes. No adaptation of the underlying transport network is necessary.

A centralized or decentralized control plane or controller for the edge switches, separated or combined with the aforementioned transport network control plane or controller, can install or distribute forwarding and network header modification policies or rules to at least one edge switch of the network. Such an installation can exploit OpenFlow, OVSDB or any other available centralized or distributed control protocol.

The steering of traffic within the network or transport network can rely on destination-based forwarding. Such a destination-based forwarding can be a destination-based hop-by-hop IP routing.

Regarding a reliable traffic steering source and destination addresses can be swapped, thus allowing SF ID to "steer" the packets towards next required SF inside a routing domain.

In another situation the steering can rely on source-based forwarding. If an underlying transport network supports source-based policy routing, then the operation of address swapping can be eliminated. The address swapping operation can be eliminated either for the traffic in a downward direction, since the common prefix is already placed into destination addresses.

Within a further preferred embodiment at least one branch of an SFC or of different SFCs can be tagged for elimination of ambiguous steering decisions.

Regarding a reliable SFC steering a SFC can be mapped with a particular traffic class. Various classification parameters can be used for such a mapping. A high-level classification can be performed by a special engine located before the SFC domain.

For providing a simple embodiment of a method and network according to the present invention an edge switch or ingress switch, preferably of SFC domain, can perform a class matching regarding an SFC. Such a class matching can be performed explicitly or implicitly wherein traffic classification can be the outcome of a previous high-level SF like DPI.

Preferably, an edge switch or ingress switch can replace network prefix bits within a source address with a logical address of the next SF in the SFC preserving host address and optionally performs swapping of source and destination addresses.

Depending on the individual situation an edge switch or ingress switch can provide an SFC identifier, SFC ID, in order to distinguish implicit class matchings within SFC domain. Such an SFC identifier, SFC ID, can be transferred together with an SF ID in a simple way. Preferably, this can be performed by borrowing lower bits of a redundant address part or of a block of redundant bits. Borrowing lower bits simplifies route aggregation in a routing domain and allows the creation of well-structured SFC topology.

If a next SF is connected to a different switch, an edge switch or intermediate switch can perform a header modification. Thus, a secure and reliable forwarding to a SF connected to a different switch can be performed.

An egress switch is usually the last switch in SFC domain to which all the packets have to be addressed after passing required SFs. Such an edge switch or egress switch can preferably be associated with a default SF logical address. Such a switch may or may be not connected to any SF.

An embodiment of the present invention describes a mechanism to implement SFCs, providing explicit traffic steering atop of traditional networks or IP networks, without requiring any modifications to the underlying forwarding commodity equipment.

Embodiments of the present invention can provide:
Allocation of logical addresses for SFs within the SFC domain.
Implementation of a logic performing SFC-to-traffic mappings atop of the edge switch Controller or as a separate high-level network application.
Translation of SFC-to-traffic mappings into forwarding policies by the edge switch Controller or a separate high-level network application.
Installation of forwarding policies by the Controller into the edge switches through the appropriate protocols, e.g., OpenFlow, OVSDB etc.
Implementation of specific packet header modifications implied by the invention—network prefix replacement and swapping of IP addresses—in the edge switches. This can be achieved performing ad-hoc extensions of software edge switches or using OpenFlow switches as edge switches.
Announcement of the presence of attached SFs and associated logical IP addresses by edge switches into the SFC routing domain.
Distribution of routing advertisements within the SFC routing domain either dynamically or statically.

According to preferred embodiments of the present invention the proposed mechanism places logical addresses of service functions directly into the destination or source IP address of the forwarded packets and, thus, enables to perform SFC steering over a traditional transport network with L3 routing or alternately exploiting policy-based routing. The underlying transport network does not need any specific adaptation in order to be aware of the steering primitives. Steering can operate in accordance with L3 routing policies within SFC domain, and thus inherits all possible advantages of underlying forwarding: fast reroute, ECMP forwarding and others. Whereas in contrast, current SFC steering solutions either require significant modifications and adaptations of underlying transport network or use performance-ineffective tunneling mechanisms.

Embodiments of the present invention can provide a SF-aware traffic steering mechanism in traditional IP networks.

Embodiments of the present invention allow the implementation of a SFC architecture by providing dynamic traffic steering mechanism that can be enforced transparently on top of a traditional IP network. Embodiments of the invention do not require any specific adaptation of the underlying transport network to a special kind of in-band or out-of-band SFC metadata and, therefore, can be implemented in common transport IP networks, built on commodity hardware routers. The embodiments exploit the presence of redundant information in subscribers' IP addresses in ISP networks, in order to encode traffic steering information related to the SFCs. Addressing of service functions in SFCs is accomplished in a clear manner and steering mechanism can rely on traditional IP destination-based hop-by-hop forwarding. Variants of the implementation can exploit PBR or MPLS forwarding.

As assumed before, subscribers' IP addresses can be organized in continuous blocks. Each address in a given block shares a common prefix with the other addresses belonging to the same block. Therefore, an address contains redundancy that can be measured by number of bits—network prefix—common for all subscribers in the network. These redundant bits are well known to all the equipment, since they are fixed by the network operator by means of configuration. Thus, they can be temporarily replaced, within the SFC domain, with SFC metadata. This metadata is used for traffic steering between SFs.

The metadata contains a unique logical address or block of addresses that works or work as service function identifiers, SF ID. The SF IDs are advertised into a routing domain for forwarding traffic towards particular SF. A centralized or decentralized control plane for the transport IP network installs routing policies towards SFs by means of IGP or static routes.

Figure 2:
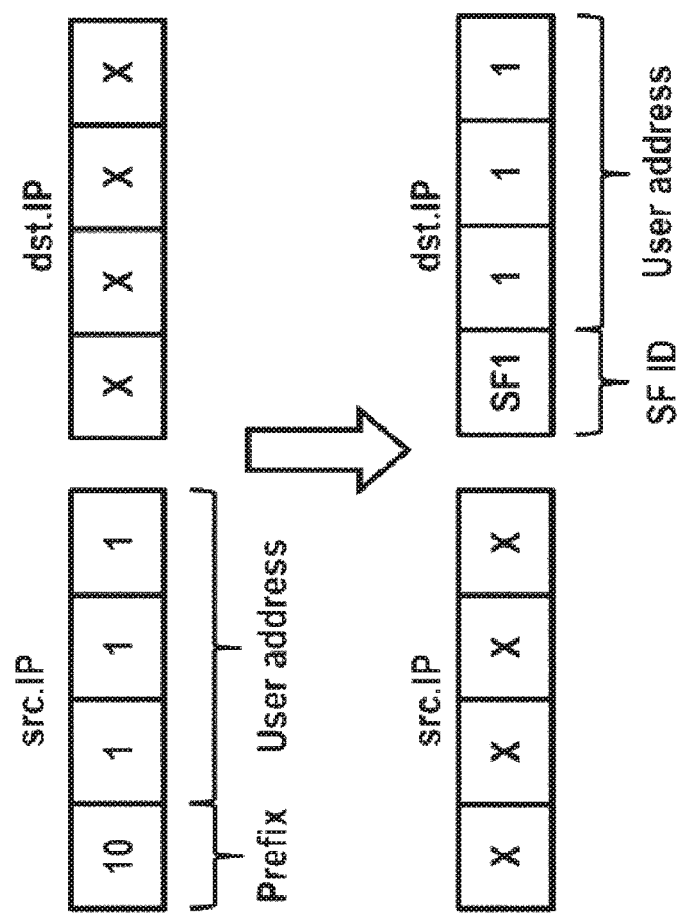
FIG. 2 shows L3 header modifications within an embodiment of the proposed invention.

For destination-based hop-by-hop IP routing, source and destination IP addresses have to be swapped, thus allowing SF ID to "steer" the packets towards next required SF inside routing domain. Described modifications of L3 overhead are presented in FIG. 2.

Source-Based Policy Routing

If underlying transport network supports source-based policy routing, then the operation of address swapping can be eliminated and forwarding between routers has to be accomplished with IP source based—PBR, OpenFlow etc.—forwarding techniques.

Downward SFC

If the traffic in a downward direction—from Internet to subscribers—has to pass through the same or other SFC within SFC domain, swapping operation is also unnecessary, since redundant bits are already placed into destinations—subscriber's—IP address.

Thus, embodiments of the proposed architecture imply several following basic operations:
Utilization of redundancy in subscribers' address space for transfer of SFC metadata by replacing of network prefix with SFs related addresses;
Providing SFs with specific addresses for destination based forwarding;
Advertisements of SFs addresses into SFC routing domain for SFC steering;
Subscriber's IP address preservation for unique source identification;
Swapping of source and destination IP addresses for destination based IP routing;
Tagging separate branches of SFC or different SFCs for elimination of ambiguous steering decisions.

Figure 3:
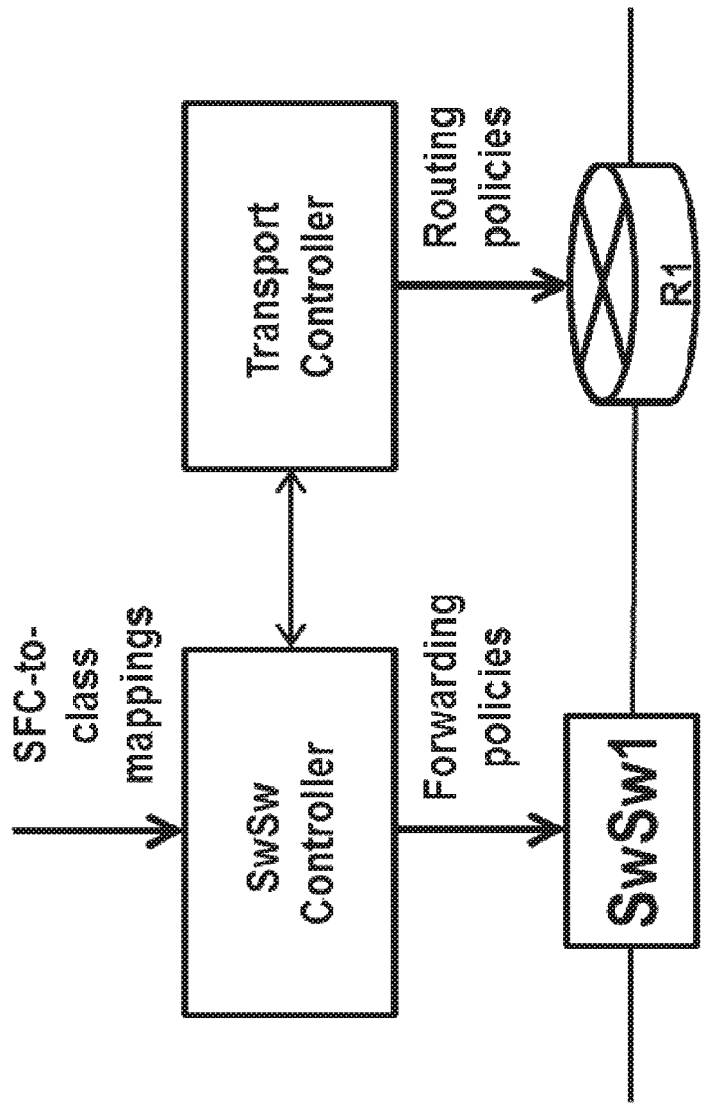
FIG. 3 illustrates an interaction of control and forwarding planes within an embodiment of the present invention, wherein the edge switch is a software switch SwSw which is configured by a logically centralized controller the SwSw controller in order to configure forwarding rules that, exploiting the transport network configuration, and enable the correct traffic steering towards SFs.

As long as underlying transport network stays untouched and transparent in the whole SFC domain and provides only IP destination based forwarding, all the described operations can be performed by SF-aware edge switches. A centralized controller for the edge switches distributes specific forwarding policies which allow an edge switch to perform required operations. Namely, a specific logical SFC is mapped with a particular traffic class and translated into a set of forwarding rules with match statements and IP header modifications and these rules are installed into the edge switch, see FIG. 3.

The logically defined SFC can be mapped with a particular traffic class using various classification parameters L2-L4 header of a received packet—IP addresses, QoS fields, TCP/UDP ports—, which can be explicitly identified by the edge switch, or with high-level traffic classes. Such high-level classification can be performed by another engine located before SFC domain, e.g. DPI, URL filtering, and transferred to the edge switch by additional in-band tagging—DSCP, VLAN ID—or by the means of out-of-band control protocol.

Within the SFC domain we can distinguish three types of edge switches according to their tasks:

Ingress Switch is the first switch in the SFC domain. It receives from the Controller SFC-to-class mappings in a form of specific forwarding rules and performs class matching explicitly or implicitly. Traffic classification is the outcome of a previous high-level SF like DPI. For instance, an OpenFlow-enabled edge switch performs explicit match of incoming flows according to the match fields in its flow table entries. The edge switch replaces the network prefix bits within the source IP address with the logical address of the next SF in the required SFC and, if required by the transport routing, swaps the IP addresses for destination-based upward L3 forwarding within the routing domain. After that, it sends packets to a neighboring router.

Intermediate Switch receives packets previously modified by the Ingress switch from a neighboring router and performs backward swapping of IP addresses—if needed—, reads logical address of next SF, replaces this address with prefix bits and forwards it to a correspondent directly connected SF. Each packet received by a SF carries its original IP addresses, that is, the header of the packet is restored to the one it used to have before entering the SFC domain. For a packet received from a directly connected SF, the intermediate switch checks the location of the next SF. If the next SF is directly connected to it, SwSw forwards packets to next SF without any additional modifications. If the next SF is connected to a different switch, the intermediate switch performs header modifications in the same manner like the Ingress Switch and forwards it to a neighboring router.

Egress Switch is the last switch in SFC domain to which all the packets have to be addressed after passing required SFs. Thus, it has to be associated with "default" SF logical address and may or may be not connected to any SF. In a ISP network, a typical role that can be assigned to the last SF is performing NAT—CGNAT—, and thus such default address can be allocated to NAT SF, placed behind egress switch.

For traffic in backward direction, egress switch performs the tasks of ingress switch and vice versa. Such, both Ingress and Egress switches can be described as Border Switches with decomposition of their functions in upward and downward directions.

SF Addressing Constrains

In the case of IPv4 RFC1918 addressing, network prefixes may vary between 8 and 24 bits, depending on ISP's architecture. With IPv6 addresses, ISPs usually receive address prefixes between /32 and /48. In use cases when SFC-to-class mappings can be explicitly detected by software switches, SFs require only one logical address per box. However, if traffic class is "hidden" from software switches, e.g. specific URL requests need to be redirected to special SF, and cannot be explicitly defined by the edge switch, then additional identification of particular SFC within SF metadata is needed. Such SFC identifier, SFC ID, can be transferred together with SF ID by borrowing lower bits in a block of redundant bits. Borrowing lower bits simplifies route aggregation in a routing domain and allows the creation of well-structured SFC topology. For instance, if we have 8 redundant bits available—10.0.0.0/8 networks—, then we can use 6 bits for logical addressing of particular SF and 2 bits for particular SFC ID passing through this SF. If longer prefixes are available for IPv4/IPv6, then we are free to address significantly higher number of SFs and SFCs.

Within allocated network prefix we need to consider "reserved" combinations of IP addresses which cannot be used as destination addresses in IP forwarding engines. For example, if we use 10.0.0.0/8 prefix, then following SF ID have to be excluded from SF "pool":
- 127—Corresponds to 127.0.0.0/8 (Loopback interfaces)
- 169—169.254.0.0/16—Link-local (forwarding policies depend on hardware)
- 224-239—Multicast addresses (224.0.0.0-239.255.255.255)
- 240-255—Class E (240.0.0.0-255.255.255.255)

Additionally, the following address combinations have to be reserved for architectural purposes and therefore have also to be excluded from SF address pool:
- 10.0.0.0/8—customer's pool private addresses, as example
- x.0.0.0/8—p2p interfaces for routing protocol in underlying transport IP network.

In case more than one private address spaces are used within provider's network, e.g. different pools for private and business subscribers, separate allocation for internal network services etc., then ambiguous combinations of private addresses also have to be excluded, and more scrupulous address planning has to be applied. Furthermore, SFC domains can be virtualized and applied to each private address pool separately. The same logic applies in a case of IPv6 address scheme—reserved and prohibited address combinations have to be excluded from SF address pool.

Embodiment 1: Service Function Chaining without Branching Service Functions

Figure 4:
FIG. 4 shows a service function chain without branches according to an embodiment of the present invention.

In a particular proposed embodiment, the invention can be applied for the provision of service function chains without presence of branching SFs, i.e. without SFs that can perform own traffic steering decisions depending on their internal policies and outcomes of the operation, see FIG. 4. In that case, the exact sequence and order of SFs within SFC for any particular traffic class can be unambiguously defined by the logically centralized edge switch controller. The edge switch Controller translates SFC-to-class mappings into forwarding rules and distributes them among corresponding switches.

Figure 5:
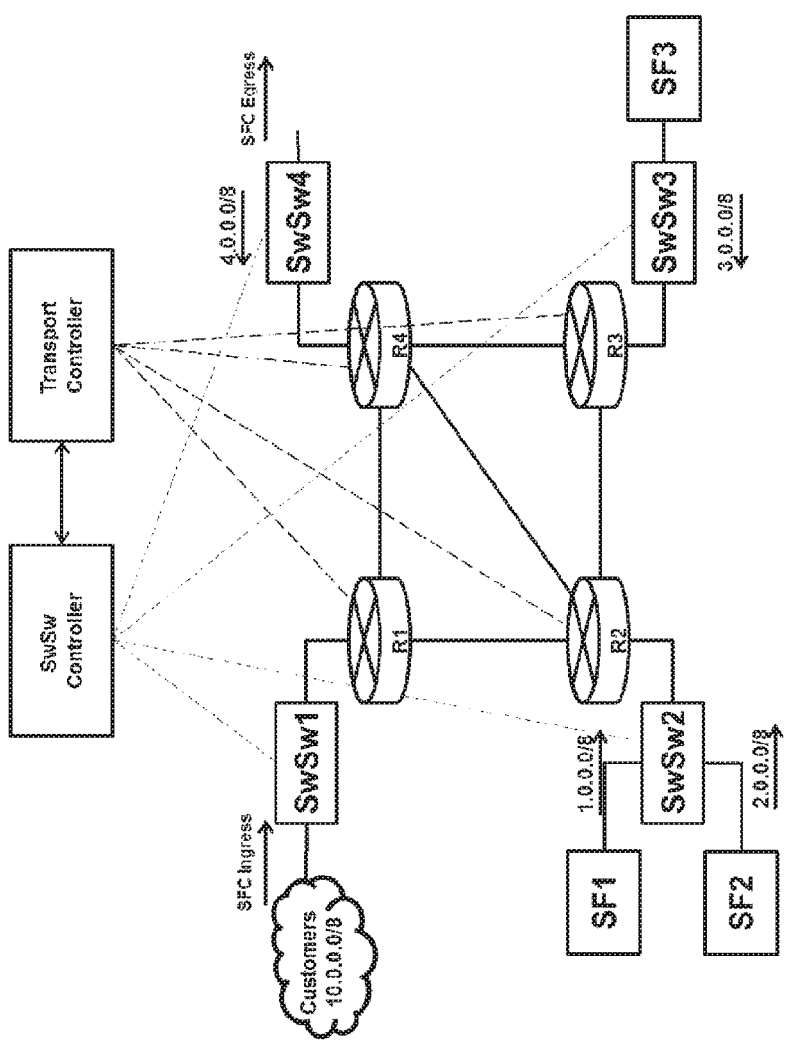
FIG. 5 shows an implementation according to an embodiment of the present invention.

We consider a particular case in which traffic initiated by subscriber with Source IP address 10.15.15.15/8 is destined towards destination IP 8.8.8.8 and have to traverse SFC: SF1-SF2-SF3, see FIG. 4. We assume the SFs to be virtual functions running on top of a hypervisor. The SFs are connected to a software edge switch, SwSw. Please notice that these last assumptions do not change the generality of the solution, but they help in describing the context in which such a solution can be applied. We assign logical addresses to SFs according to their numbers, which, in fact, transforms into corresponding route advertisements, e.g. 1.0.0.0/8 for SF1, 2.0.0.0/8 for SF2, etc. Since SwSw4 in that particular case has no attached SF to it and is the last switch in SFC domain, then it has to advertise the "default" address 4.0.0.0/8 to forward traffic outside SFC domain, see FIG. 5.

Table 1 provides a detailed overview of forwarding policies installed in correspondent software switches in that case. Transport controller distributes routing policies—route advertisements—such that corresponding SF IDs become reachable through appropriate router-to-SwSw interfaces.

TABLE 1

Forwarding rules in software switches in SFC without branches

| Switch | Ingress Port | Actions | L3 Header modifications | Forward |
|---|---|---|---|---|
| SwSw1 | SFC Ingress | Inject SF1 address Swap IP addresses | src.ip=10.15.15.15, dst.ip=8.8.8.8 → src.ip=8.8.8.8, dst.ip=1.15.15.15 | R1 |
| SwSw2 | R2 | restore network prefix Swap IP addresses | src.ip=8.8.8.8, dst.ip=1.15.15.15 → src.ip=10.15.15.15, dst.ip=8.8.8.8 | SF1 |
| SwSw2 | SF1 | None | None | SF2 |
| SwSw2 | SF2 | Inject SF3 address Swap IP addresses | src.ip=10.15.15.15, dst.ip=8.8.8.8 → src.ip=8.8.8.8, dst.ip=3.15.15.15 | R2 |
| SwSw3 | R3 | restore network prefix Swap IP addresses | src.ip=8.8.8.8, dst.ip=3.15.15.15 → src.ip=10.15.15.15, dst.ip=8.8.8.8 | SF3 |
| SwSw3 | SF3 | Inject SwSw4 address Swap IP addresses | src.ip=10.15.15.15, dst.ip=8.8.8.8 → src.ip=8.8.8.8, dst.ip=4.15.15.15 | R3 |
| SwSw4 | R4 | restore network prefix Swap IP addresses | src.ip=8.8.8.8, dst.ip=4.15.15.15 → src.ip=10.15.15.15, dst.ip=8.8.8.8 | SFC Egress |

As was mentioned before, the address swapping operation can be eliminated if the transport network supports IP source-based forwarding and for traffic in downward—towards subscribers—direction.

Embodiment 2: Service Function Chaining with Branching Service Functions

Figure 6:
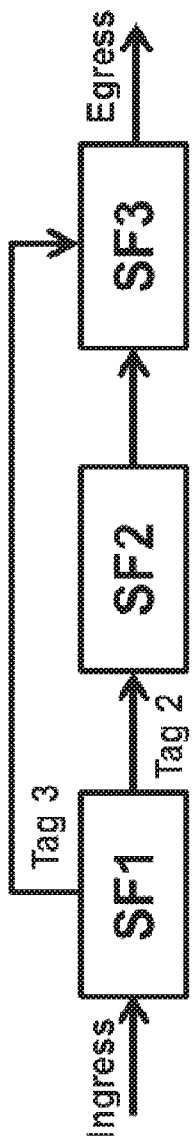
FIG. 6 shows a service function chain with branches according to an embodiment of the invention.

In this embodiment, we consider an implementation where the SFC contains SFs which can introduce branches. We argue that an ambiguity in traffic steering brought in by branching SFs can be recognized and handled by means of additional traffic tagging between the SF and the SwSw. For instance, in the previous example SF1 can introduce branch: according to its internal logic it sends part of processed traffic to SF2 and another part to SF3, see FIG. 6.

The SwSw controller cannot predict the outcomes of operations of SF1. However, it can install additional match tags criteria into corresponding software switch, SwSw2, provided that branching SF1 will tag the traffic accordingly, see FIG. 6. Any type of available L2-L4 tagging—VLAN ID, DSCP, etc.—can be applied. Assume that SF1 marks a traffic destined to SF2 with tag=2, and to SF3 with tag=3. Then, correspondent forwarding policies in SwSw2 will look as presented in Table 2—forwarding rules in other switches stay unchanged.

TABLE 2

Forwarding rules in software switches in SFC with branches

| Switch | Ingress Port | Tag | L3 Header modifications | Forward |
|---|---|---|---|---|
| SwSw2 | R2 | — | src.ip=8.8.8.8, dst.ip=1.15.15.15 → src.ip=10.15.15.15, dst.ip=8.8.8.8 | SF1 |
| SwSw2 | SF1 | Tag=2 | None | SF2 |
| SwSw2 | SF1 | Tag=3 | src.ip=10.15.15.15, dst.ip=8.8.8.8 → src.ip=8.8.8.8, dst.ip=3.15.15.15 | SF3 |
| SwSw2 | SF2 | — | src.ip=10.15.15.15, dst.ip=8.8.8.8 → src.ip=8.8.8.8, dst.ip=3.15.15.15 | R2 |

Embodiment 3: Service Function Chaining with Implicit Traffic Classes

As it was argued before, if traffic classes cannot be recognized—matched—explicitly by edge switches in SFC domain, an additional SFC ID is needed. This SFC ID has to be injected by the ingress switch and has to pass through the SFC domain transparently, i.e., neither the SFs nor the SwSw can modify or drop it. As proposed by this invention, the ingress SwSw adds a specific SFC ID by borrowing lower bits of the redundant IP address part. It maps a given traffic class with the SFC ID in accordance with the policies received from the Controller or from previous service functions, e.g. according to tags received from DPI. For instance, two lower bits from 8 available bits considered in the previous examples are reserved for identification of a particular service chain. That turns into a block of address allocated to SFs: SF1—1.0.0.0/6, SF2—4.0.0.0/6, SF3—8.0.0.0/6. A given SFC traversing the specific SF can be associated with a specific address in these blocks. The service functions can be involved in less SFCs than the available number of addresses within an allocated block, thus unused addresses can be redistributed to other SFs.

Service functions have to preserve the SFC ID and to return it transparently to SwSw for further forwarding decisions. Such SFC ID preservation can be implemented with SwSw-to-SF tagging in a similar way as it was described in the previous section. However, here the SwSw sets the tag, not the SF, and the SF returns the tag back to the SwSw transparently.

Figure 7:
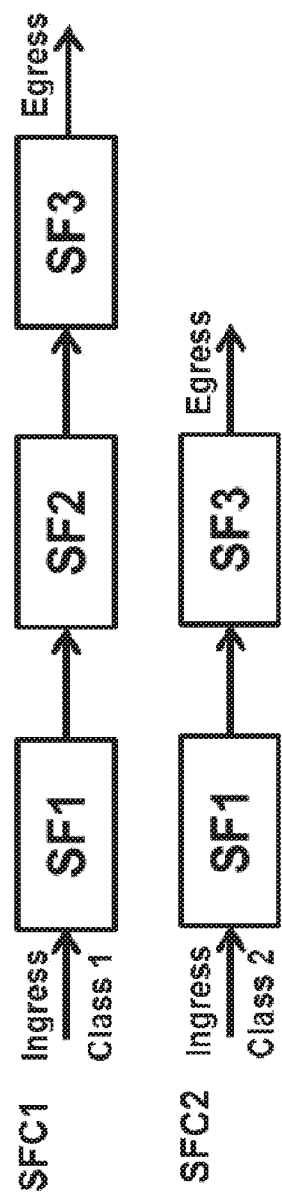
FIG. 7 shows a service function chain with implicit traffic classes according to an embodiment of the invention.

In the following example we create two SFCs: SFC1 and SFC2 associated with two implicit traffic classes, see FIG. 7.

We associate the SFCs with specific SF addresses in following order:

SFC1: 1.0.0.0/8 (SF1)→4.0.0.0/8 (SF2)→8.0.0.0/8 (SF3→12.0.0.0/8 (SwSw4)

SFC2: 2.0.0.0/8 (SF1)→9.0.0.0/8 (SF3)→12.0.0.0/8 (SwSw4)

For SFC ID preservation, the SwSw2 tags packets for SFC1 with tag=1 and for SFC2 with tag=2 when it sends traffic towards SF1. Table 3 presents forwarding policies in SwSw1 and SwSw2.

TABLE 3

Forwarding rules in software switches with implicit traffic classes

| Switch | Traffic Class | Ingress Port | Tag | L3 Header modifications | Forward |
|---|---|---|---|---|---|
| SwSw1 | Class 1 | SFC Ingress | — | src.ip=10.15.15.15, dst.ip=8.8.8.8 → src.ip=8.8.8.8, dst.ip=1.15.15.15 | R1 |
| SwSw1 | Class 2 | SFC Ingress | — | src.ip=10.15.15.15, dst.ip=8.8.8.8 → src.ip=8.8.8.8, dst.ip=2.15.15.15 | R1 |
| SwSw2 | Class 1 | R2 | — | src.ip=8.8.8.8, dst.ip=1.15.15.15 → src.ip = 10.15.15.15, dst.ip=8.8.8.8 | SF1, tag=1 |
| SwSw2 | Class 2 | R2 | — | src.ip=8.8.8.8, dst.ip=2.15.15.15 → src.ip=10.15.15.15, dst.ip=8.8.8.8 | SF1, tag=2 |
| SwSw2 | Class 1 | SF1 | tag=1 | None | SF2 |
| SwSw2 | Class 1 | SF2 | — | src.ip=10.15.15.15, dst.ip=8.8.8.8 → src.ip=8.8.8.8, dst.ip=8.15.15.15 | R2 |
| SwSw2 | Class 2 | SF1 | tag=2 | src.ip=10.15.15.15, dst.ip=8.8.8.8 → src.ip=8.8.8.8, dst.ip=9.15.15.15 | R2 |

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Abbreviations:
SFC: Service Function Chain
SF: Service Function
SLA: Service Level Agreement
DPI: Deep packet inspection
NAT: Network address translator
ISP: Internet service provider
NMS: Network Monitoring/Management System
DSCP: Differentiated Service Code Point
ToS: Type of Service
VRF: Virtual Routing and Forwarding
VPN: Virtual Private Network
CLI: Command Line Interface
VM: Virtual Machine
PBR: Policy based routing
CG-NAT: Carrier Grade Network address translator
ECMP: Equal Cost Multi Path
SwSw: Software Switch
HwSw: Hardware Switch
IGP: Interior Gateway Protocol
QoS: Quality of Service
P2P: Peer to peer

The invention claimed is:

1. A method for routing traffic in a network, the method comprising:
   establishing a mapping between a traffic class and a service function chain (SFC) comprising several service functions (SFs), wherein the mapping is in a form of a set of forwarding rules with match statements and IP header modifications;
   installing, onto an edge switch, the set of forwarding rules;
   receiving, by the edge switch, a packet belonging to the traffic class, the packet including a source internet protocol (IP) address and a destination IP address, each of the source IP address and the destination IP address including a redundant information portion and a non-redundant information portion;
   replacing, by the edge switch, redundant information portion of the source IP address of the packet belonging to the traffic class and/or the destination IP address of the packet belonging to the traffic class with a logical address of a next SF in the SFC to which the traffic class is mapped so as to provide a modified packet, the modified packet including the non-redundant information portion of the source IP address and the non-redundant information portion of the destination IP address; and
   steering, according to the logical address of the next SF, the modified packet to the next SF in the SFC to which the traffic class is mapped.

2. The method according to claim 1, wherein the redundant information portion of the source IP address and/or the redundant information portion of the destination IP address is a common prefix of host addresses within an addressing scheme of network hosts.

3. The method according to claim 2, wherein the logical address of a next SF in the SFC to which the traffic class is mapped is SFC metadata used for traffic steering between and/or to the SFs.

4. ; The method according to claim 3, wherein the SFC metadata contains a unique logical address that serves as a service function identifier (SF ID) or a block of addresses that serve as an SF ID.

5. The method according to claim 4, wherein SF IDs or SF addresses are represented as conventional network addresses and advertised into a routing domain of an underlying transport network for forwarding traffic towards one or more particular SFs.

6. The method according to claim 1, wherein a centralized or decentralized control plane or controller for the network or transport network installs routing policies towards one or more SFs to at least one intermediate router, and wherein a centralized or decentralized control plane or controller for edge switches, separated or combined with the aforementioned transport network control plane or controller, performs the installing, onto the edge switch, the set of forwarding rules.

7. The method according to claim 1, wherein the traffic steering relies on destination-based forwarding.

8. The method according to claim 7, wherein the source IP address of the packet belonging to the traffic class and the destination IP address of the packet belonging to the traffic class are swapped.

9. The method according to claim 1, wherein the traffic steering relies on source-based forwarding.

10. The method according to claim 1, wherein at least one branch of an SFC or of different SFCs are tagged for elimination of ambiguous steering decisions.

11. The method according to claim 1, wherein the edge switch is an ingress switch of an SFC domain, and wherein the edge switch performs a class matching to match the packet belonging to the traffic class with the traffic class.

12. The method according to claim 1, wherein the replacing by the edge switch, the redundant information portion of the source IP address of the packet belonging to the traffic class and/or the destination IP address of the packet belonging to the traffic class with a logical address of a next SF in the SFC to which the traffic class is mapped so as to provide a modified packet comprises replacing network prefix bits within the source IP address with a logical address of a next SF in an SFC preserving host address.

13. The method according to claim 1, wherein an ingress switch provides an SFC identifier (SFC ID) in order to distinguish implicit class matching within an SFC domain.

14. The method according to claim 1, wherein the redundant information portion of the source IP address of the packet belonging to the traffic class and/or the destination IP address of the packet belonging to the traffic class is replaced with both the logical address of the next SF in the SFC to which the traffic class is mapped and an SFC identifier (SFC ID).

15. The method according to claim 1 wherein the edge switch performs a header modification if the next SF in the SFC to which the traffic class is mapped is connected to a different switch.

16. The method according to claim 1, wherein an egress switch is associated with a default SF logical address.

17. A traffic routing network comprising:

a switch controller, configured to:

establish a mapping between a traffic class and a service function chain (SFC) comprising several service functions (SFs), wherein the mapping is in a form of a set of forwarding rules with match statements and IP header modifications, and install, onto an edge switch, the set of forwarding rules; and the edge switch, configured to;

receive a packet belonging to the traffic class, the packet including a source internet protocol (IP) address and a destination IP address, each of the source IP address and the destination IP address including a redundant information portion and a non-redundant information portion;

replace the redundant information portion of the source IP address of the packet belonging to the traffic class and/or the destination IP address of the packet belonging to the traffic class with a logical address of a next SF in the SFC to which the traffic class is mapped so as to provide a modified packet, the modified packet including the non-redundant information portion of the source IP address ant non-redundant information portion of the destination IP address, and steer, according to the logical address of the next SF, the modified packet to the next SF in the SFC to which the traffic class is mapped.

* * * * *